July 2, 1946.  H. S. GATES  2,403,072

ELECTRICAL INDUCTION APPARATUS

Filed June 30, 1943  2 Sheets-Sheet 1

WITNESSES:

INVENTOR
Henry S. Gates.
BY
ATTORNEY

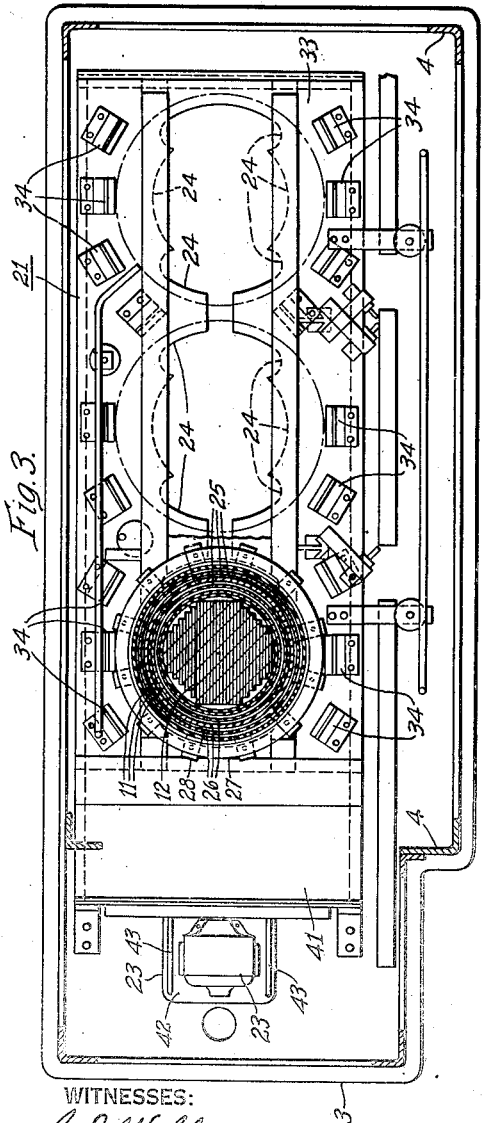
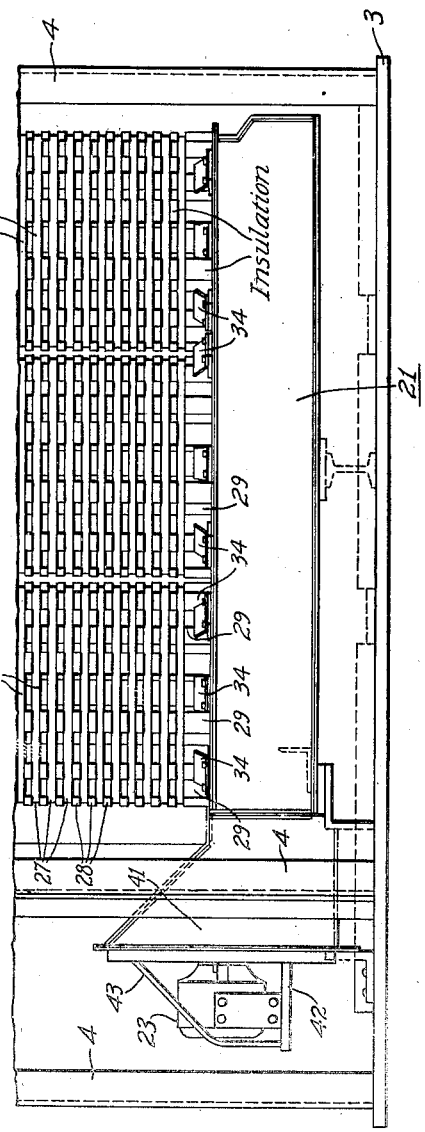

Patented July 2, 1946

2,403,072

UNITED STATES PATENT OFFICE 2,403,072

ELECTRICAL INDUCTION APPARATUS

Henry S. Gates, Sharon, Pa., assignor to Westinghouse Electric Corporation, East Pittsburgh, Pa., a corporation of Pennsylvania Application June 30, 1943, Serial No. 492,874

9 Claims. (Cl. 175—361)

This invention relates to electrical apparatus, such as transformers, and particularly to air-cooled air-insulated transformers for use in electrical distribution systems. In such transformers air is permitted to circulate upwardly between the inner and outer cylindrical windings positioned about the winding leg of the core and between the core winding leg and the inner winding to form a cooling and insulating medium in the spaces there provided.

It is customary to provide some arrangement of the casing or housing in which such electrical apparatus is mounted that permits the ready ingress of the air about the area around the lower part of the windings and egress of the air from the upper part of the windings so that the circulation of the air may be readily accomplished by thermal action of the apparatus in heating the air.

In recently developed air-cooled air-insulating transformers of this type, the air circulates by thermal action, thus eliminating the need for either a liquid as an insulating and cooling medium or the old type of air blast in which the equipment is enclosed in a closed tank and blasts of air are continuously forced against the winding conductors between partitions positioned in the structure for directing the cooling air.

It is an object of the invention to provide an air-cooled air-insulated transformer unit having an air chamber associated therewith containing openings so positioned and arranged as to direct the flow of air under pressure from the chamber below the windings upwardly about the core and coil parts to assist in the cooling and insulating of these parts.

Figure 1:
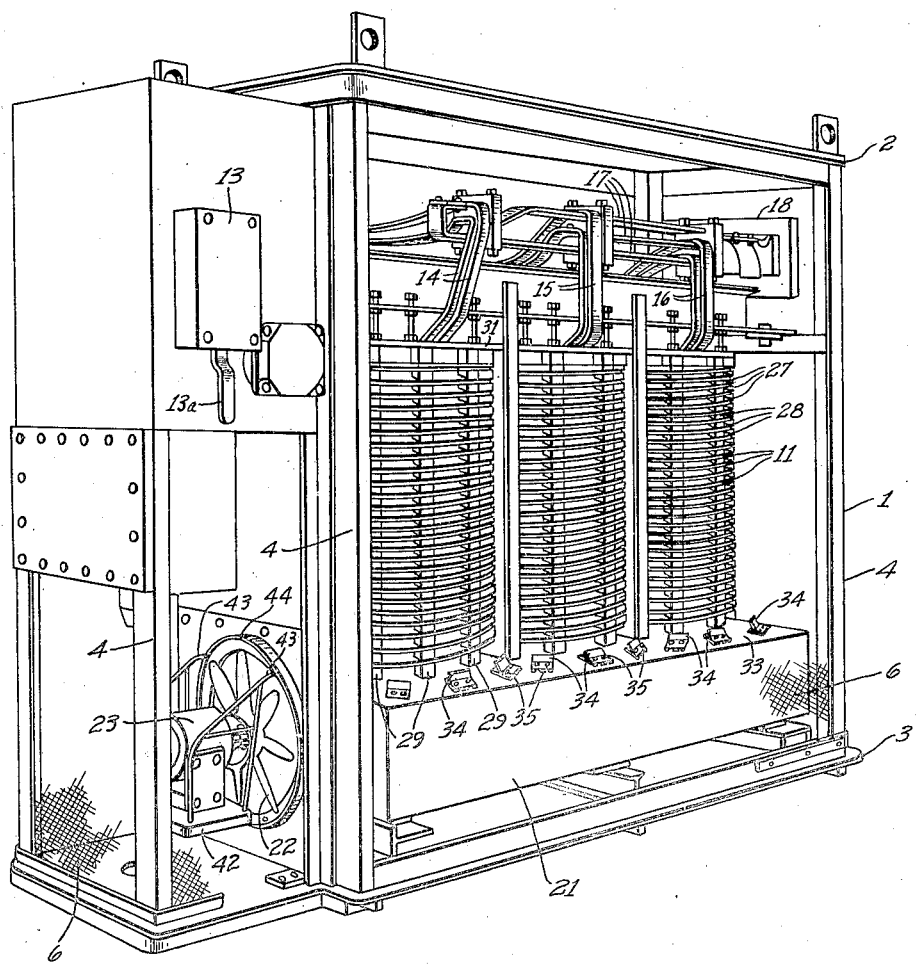
Figure 2:
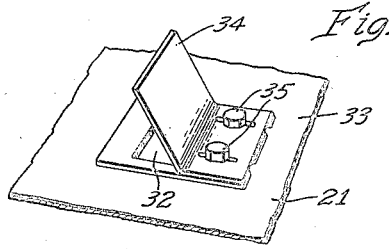

Other objects and advantages of the invention will be apparent from the following description of a preferred embodiment of the invention, reference being had to the accompanying drawings, in which:

Figure 1 is a perspective view of a three-phase transformer unit organized in accordance with the invention, Fig. 2 is a perspective view of a detail thereof, Fig. 3 is a plan view partly in section and with parts removed showing the air compartment below the core and coil assembly structure, and Fig. 4 is a side elevational view of the lower part of the transformer unit.

Referring to the drawings and particularly to Fig. 1 thereof, a housing 1 is provided having a continuous sheet metal top 2 with downwardly extending flanges adjacent the edges thereof and a sheet metal bottom 3 having upwardly extended flanges adjacent the edges. The top and bottom portions of the housing are joined by vertical steel supporting members 4 and a metal mesh 6 may be provided extending between the top and bottom members and between the vertical supporting members 4 to protect the apparatus. The main said portions of the apparatus may be formed of doors comprised largely of such material, the doors being not shown in Fig. 1 so as to more clearly show the structure within the housing. The side panels or doors, may, if desired, be made of steel plate with openings adjacent the top and bottom covered with expanded metal mesh. The general character of the core and coil structure assembly may correspond to that disclosed in Patent No. 2,295,415 for Air-cooled air-insulated transformer, issued September 8, 1942, to G. R. Monroe and assigned to the same assignee as this application, and as arranged within a housing structure in the manner shown in application Serial No. 444,508, for Transformers, filed May 26, 1942, by H. S. Gates and H. D. James and assigned to the assignee as this application.

A plurality of sets of windings 11, one set for each of the three phases, are mounted on three separate core legs of a three-phase transformer core structure one leg of which, 12, is shown in Fig. 3. A plurality of phase windings are provided about each core leg including at least one low voltage and one high voltage winding on each leg. The high-voltage terminals of the three-phase windings may be connected by a switch 13 having an operating handle 13a to a high-voltage alternating-current supply circuit and the low-voltage terminals 14, 15 and 16 of the three low-voltage windings may be connected through terminal bars 17 and a low-voltage bushing block 18 to the outside low-voltage terminals of the transformer unit in a well-known manner. An elongated casing 21 is provided in the lower portion of the housing 1 extending beneath the core and winding structure providing a chamber for directing air under pressure as supplied by a fan 22 driven by an electric motor 23 to the chamber defined by the walls of the casing 21.

An opening is provided in the upper wall of the casing 21, best shown as outlined by the lines 24 in Fig. 3, providing spaces beneath each of the three stacks of phase windings through which air is directed upwardly from the casing 21 about the core winding legs in such manner as to pass upwardly between the core and the inner coil of the winding and between the several coils of the winding assembly in the spaces 25 provided therebetween. This opening is a single continuous opening extending under all three sets of phase windings, so as to prevent circulating currents in a shirt circuited turn of steel which would be caused to flow in the upper wall 33 of the casing about the separate axis of the three sets of phase windings, if three separate openings were provided.

As shown in Fig. 3, the inner or low-voltage winding consists of a plurality of thin cylindrical windings 26 spaced from one another and from the core leg 12, and an outer or high-voltage winding is formed of a plurality of disk type coils 27 positioned one above the other in a stack and spaced apart by insulating spacers 28. Blocks 29 of insulating material are provided below the bottom of the outer winding 27 and above the top thereof, providing spaces therebetween for the free flow of air toward the center of the coil assembly at the bottom and from the center of the coil assembly at the top, and the end plates 31 may also be formed so as to permit free flow of the air upwardly between the inner cylindrical coils 26.

Additional ports or openings 32 are provided in the upper wall 33 of the casing 21 to which deflector plates 34 may be attached as by means of bolts 35, as shown in detail in Fig. 2. The positions of these ports and deflector members are best shown in Figs. 1 and 3. Three such ports and deflectors are shown on each side of each of the three-phase winding assemblies directing the air inwardly and upwardly toward the surface of the outer winding. The air thus forced from the chamber within the housing 21 upwardly therefrom and about the various parts of the core and coil assembly will, together with the natural circulation of air by thermal means, also draw additional air from about the windings adjacent the bottom thereof upwardly along the surfaces of the various winding coils to cool them and to maintain a layer of insulating air between the various parts of the winding surfaces. Any convenient manner of supplying air under pressure to the casing within the container 21 may be provided. As illustrated, one end of the casing is provided with an enlarged funnel-shaped portion 41, best shown in Fig. 4, to the mouth of which the fan 22 driven by the motor 23 supplies air into the chamber formed by the walls of the casing 21. The fan and motor assembly are shown mounted on a supporting platform 42 carried by brackets 43 from a flange 44 about the opening through which air is supplied to the casing.

Modifications in the specific structure and arrangement of parts may be made within the spirit of the invention, and I do not wish to be otherwise limited than by the scope of the appended claims.

I claim as my invention:

1. In electrical induction apparatus, a core structure having a vertically positioned winding leg, a plurality of cylindrical windings about the winding leg, spaced from the leg and from one another to provide spaces for the free flow of air as a cooling and insulating medium upwardly along the inner and outer surfaces of the several windings, a housing positioned below the windings providing a chamber, means for directing air under pressure into the chamber, an opening in the top of the housing positioned centrally of the windings for directing the flow of air under pressure upwardly within the several windings, and openings in the top of the housing positioned below and about the outer winding and arranged for directing air under pressure upwardly and inwardly against the outer winding for causing the flow of air upwardly along the winding.

2. In an electrical apparatus unit, an elongated housing for the unit, a casing forming the walls of an air chamber extending longitudinally along the lower portion of the housing, a core and coil assembly having primary and secondary windings mounted within the housing above the air chamber, means for supplying air under pressure to the air chamber, an opening in the upper wall of the air chamber positioned for directing the flow of air upwardly within the several windings, ports in the upper wall of the chamber arranged about the several windings and having deflecting plates adjustable to vary the effective size of the ports and positioned to direct air from the chamber upwardly and inwardly against the outer winding for causing the flow of air upwardly along the outer winding surface.

3. In an electrical apparatus unit, an elongated housing for the unit, an elongated casing forming the walls of an air chamber extending along the lower portion of the housing, a core structure having vertically positioned winding legs, a plurality of windings about each winding leg spaced from the winding leg and from one another to provide spaces for the free flow of air as a cooling and insulating medium upwardly between the windings, a blower for directing air under pressure into one end of the chamber, an opening in the upper wall of the chamber positioned for directing the flow of air under pressure upwardly within the several windings, and ports in the upper wall of the chamber positioned to direct air from the chamber upwardly and inwardly against the windings for causing a rapid rate of flow of air upwardly along the outer surface of the windings.

4. In electrical induction apparatus, a core structure having a vertically positioned winding leg, a plurality of cylindrical windings about the winding leg, spaced from the leg and from one another to provide spaces for the free flow of air as a cooling and insulating medium upwardly along the inner and outer surfaces of the several windings, a housing positioned below the windings providing a chamber, means for directing air under pressure into the chamber, openings in the top of the housing positioned below and about the outer winding and arranged for directing air under pressure upwardly and inwardly against the outer winding for causing the flow of air upwardly along the winding.

5. In an electrical apparatus unit, an elongated housing for the unit, a casing forming the walls of an air chamber extending longitudinally along the lower portion of the housing, a core and coil assembly having primary and secondary windings mounted within the housing above the air chamber, means for supplying air under pressure to the air chamber, an opening in the upper wall of the air chamber positioned for directing the flow of air upwardly within the several windings, and ports in the upper wall of the chamber positioned to direct air from the chamber upwardly and inwardly against the outer winding for causing the flow of air upwardly along the outer winding surface.

6. In an electrical apparatus unit, an elongated housing for the unit, an elongated casing forming the walls of an air chamber extending along the lower portion of the housing, a core structure having vertically positioned winding legs, a plurality of windings about each winding leg spaced from the winding leg and from one another to provide space for the free flow of air as a cooling and insulating medium upwardly between the windings, a blower for directing air under pressure into one end of the chamber, an opening in the upper wall of the chamber positioned for directing the flow of air under pressure upwardly within the several windings, ports in the upper wall of the chamber positioned about the winding and deflector plates associated therewith for directing air from the chamber upwardly and inwardly against the windings for causing a rapid rate of flow of air upwardly along the outer surface of the windings.

7. In electrical induction apparatus, a three-phase core structure having three vertically positioned winding legs, a plurality of cylindrical windings about each winding leg, spaced from the leg and from one another to provide spaces for the free flow of air as a cooling and insulating medium upwardly along the inner and outer surfaces of the several windings, a housing positioned below the windings providing a chamber, means for directing air under pressure into the chamber, a single continuous opening in the top of the housing having rounded edged portions outlining the lower end of the phase windings on each core leg and positioned below the outer winding and arranged for directing air under pressure upwardly along the windings.

8. In an electrical apparatus unit, an elongated housing for the unit, a casing forming the walls of an air chamber extending longitudinally along the lower portion of the housing, a three-phase core and coil assembly having three sets of primary and secondary phase windings mounted in a row within the housing above the air chamber, means for supplying air under pressure to the air chamber, a single continuous opening in the upper wall of the air chamber having rounded portions following the curvature of the phase windings on each core leg and positioned for directing the flow of air upwardly within the several windings, ports in the upper wall of the chamber arranged about the several windings and having deflecting plates adjustable to vary the effective size of the ports and positioned to direct air from the chamber upwardly and inwardly against the outer winding for causing the flow of air upwardly along the outer winding surface.

9. In an electrical apparatus unit, an elongated housing for the unit, an elongated casing forming the walls of an air chamber extending along the lower portion of the housing, a three-phase core structure having three vertically positioned winding legs, a plurality of windings about each winding leg spaced from the winding leg and from one another to provide spaces for the free flow of air as a cooling and insulating medium upwardly between the windings, a blower for directing air under pressure into one end of the chamber, a single continuous opening in the upper wall of the chamber having rounded portions following the curvature of the phase windings on each core leg and positioned for directing the flow of air under pressure upwardly within the several windings, and ports in the upper wall of the chamber positioned to direct air from the chamber upwardly and inwardly against the windings for causing a rapid rate of flow of air upwardly along the outer surface of the windings.

HENRY S. GATES.